Feb. 9, 1971 A. SIMMON 3,561,867
ILLUMINATING SYSTEM FOR PHOTOGRAPHIC PRINTERS AND ENLARGERS
Filed Dec. 20, 1968 6 Sheets-Sheet 2

INVENTOR.
ALFRED SIMMON
BY
McGlew & Toren
ATTORNEYS

INVENTOR.
ALFRED SIMMON
BY
ATTORNEYS

INVENTOR.
ALFRED SIMMON
BY
McGlew & Toren
ATTORNEYS

Feb. 9, 1971 A. SIMMON 3,561,867
ILLUMINATING SYSTEM FOR PHOTOGRAPHIC PRINTERS AND ENLARGERS
Filed Dec. 20, 1968 6 Sheets-Sheet 6

INVENTOR.
ALFRED SIMMON
BY
*McGlew & Toren*
ATTORNEYS

United States Patent Office 3,561,867
Patented Feb. 9, 1971

3,561,867
ILLUMINATING SYSTEM FOR PHOTOGRAPHIC
PRINTERS AND ENLARGERS
Alfred Simmon, New York, N.Y., assignor to Berkey
Photo, Inc., Woodside, N.Y.
Filed Dec. 20, 1968, Ser. No. 785,714
Int. Cl. G03b 27/54
U.S. Cl. 355—67                                  18 Claims

ABSTRACT OF THE DISCLOSURE

An illuminating system for photographic printers and enlargers includes a single source of light, a light collector and a light integrator. The light integrator has a relatively small entrance window and a relatively larger light exit window. The single source of light, the light collector, an aperture reducer, in the form of an inverted, truncated cone or polygonal pyramid of clear transparent material with an index of refraction larger than unity, and a light distributor, in the form of a polygonal pyramid or preferably a cone, with a specularly reflecting exterior surface, are positioned on a common axis passing through the center of the light entrance window and the light exit window of the integrator, which is in the form of a modified hollow sphere having a diffusely reflecting interior surface. The aperture reducer greatly reduces the required size of the light entrance window of the light integrator, and the light distributor provides for the same light integration effect to be obtained with a single light source as hitherto obtainable with two light sources.

BACKGROUND OF THE INVENTION

The invention is directed to an improvement on the illuminating apparatus for photographic printers and enlargers disclosed in my prior U.S. Pat. No. 3,028,483.

The apparatus of my prior patent comprises three principal elements, including a source of light, a light collector and a light integrator. The source of light usually is an incandescent lamp having a small and concentrated filament. The light collector is an elliptical reflector with a specularly reflecting interior surface. The light integrator is a hollow and usually spherical body with a white, non-gloss, diffusely reflecting interior surface, and formed with a relatively small aperture, called the entrance window, through which the light enters. The integrator is also formed with another and usually larger aperture, called the exit window, through which the light emerges in order to illuminate a photographic negative or transparency.

In my prior patent, the components are assembled so that the filament of the lamp is positioned at a first focal point of the elliptical reflector. The sub-assembly of the lamp and the reflector is then placed exterior to, but adjacent, the integrating sphere, so that the second focal point of the elliptical reflector falls within the area of the light entrance window. The apparatus functions in such a manner that the light from the lamp is collected by the elliptical reflector and directed through the small entrance window into the integrating sphere. The light emerges from the integrating sphere, after repeated diffuse reflections, through the large exit window where it can be utilized to illuminate a transparency which has been placed in front of the exit window. If color prints are desired, suitable filters are placed between the two focal points of the elliptical reflector.

In the previously patented apparatus, the light entrance window and the light exit window are placed at right angles relative to each other. Since this would result in a lopsided light distribution over the area of the negative or transparency, two light sources, rather than one, with their associated reflectors, are provided and these are placed on diametrically opposite sides of the integrating sphere which thus requires two entrance windows in place of one. This results in a balanced light distribution, so that the unit has satisfactory performance characteristics. However, due to the necessary duplication of many components, the apparatus shown in my Pat. No. 3,028,-483 becomes relatively complicated and expensive.

SUMMARY OF THE INVENTION

This invention relates to an illuminating system for photographic printers and enlargers and, more particularly, to such a system including a single source of light and operating as efficiently as prior systems or apparatus requiring two light sources while being simpler and more economical to manufacture.

The illuminating system of the present invention includes the three principal elements used in the prior art, and comprising a source of light, a light collector and a light integrator. However, the illuminating system of the invention differs from that of the prior art in that all components are aligned on a common optical axis, while two additional elements have been added.

The first of these elements can be termed a "light distributor," and this element is a polygonal pyramid or, and preferably, a cone, with a specularly reflecting exterior surface. The light distributor is positioned inside of the integrating sphere, directly in front of the entrance window.

The second added element is what may be termed "an aperture reducer." This element is essentially an inverted, truncated cone or polygonal pyramid made from clear transparent material with an index of refraction larger than unity. The aperture reducer is disposed between the light collector and the light distributor. The aperture reducer provides for a very substantial reduction in the area of the light entrance window and a very substantial reduction in the light distributor. The light distributor, on the other hand, acts not only to distribute the light from the light source as reflected by the light collector but also prevents direct rays from the entrance window from reaching the area of the exit window.

An object of the invention is to provide an improved illuminating system for photographic printers and enlargers.

A further object of the invention is to provide such an illuminating system requiring only one light source while operating with at least the efficiency of prior arrangements requiring two light sources.

A further object of the invention is to provide such an illuminating system including, as an additional element, a light distributor within the light integrator.

Another object of the invention is to provide such an illuminating system including, as still a further element, an aperture reducer positioned between the light collector and the light distributor.

A further object of the invention is to provide an illuminating system for photographic printers and enlargers which is simpler and more economical to manufacture than prior known illuminating systems or apparatus for this purpose.

Yet another object of the invention is to provide such an illuminating system including a novel and improved design of the light exit portion of the light integrator.

For an understanding of the principles of the invention, reference is made to the following description of typical embodiments thereof as illustrated in the accompanying drawings.

BRIEF DESCRIPTION OF THE DRAWINGS

In the drawings.

FIGS. 9a through 17a are side elevation views of light integrators embodying the invention;

FIGS. 9b through 17b are exit side plan views of the light integrators shown in FIGS. 9a through 17a, respectively.

DESCRIPTION OF THE PREFERRED EMBODIMENTS

Figure 1:
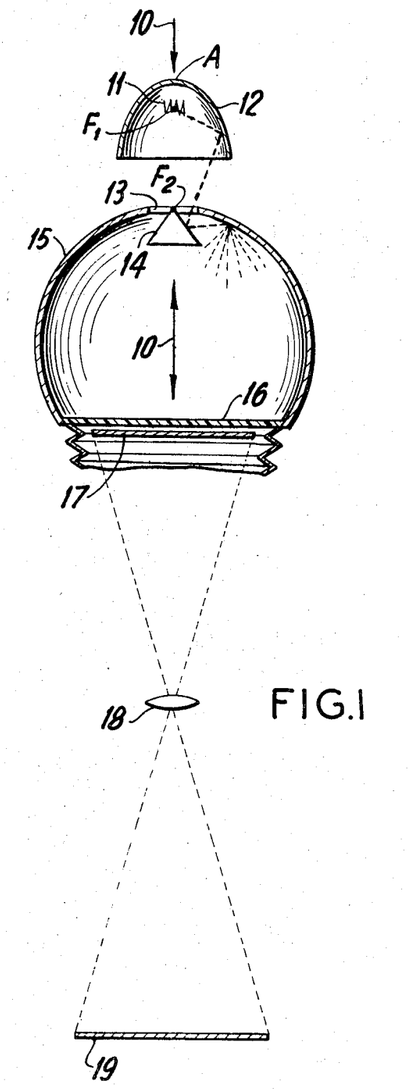
FIG. 1 is a part sectional view illustrating the illuminating system of the invention in a greatly simplified form, with the aperture reducer being omitted, and further illustrating the paths of certain light rays.

Referring to FIG. 1, it will be noted that the illumination system of the present invention, in its simplest form, differs from the mentioned prior art illuminating apparatus in two respects. In the first place, all of the components including the light source 11, the light collector 12, and the light integrator 15 are aligned on a common axis 10 which extends through the centers of the light entrance window 13 and the light exit window 16. In the second place, a new element 14, hereinafter termed a "light distributor" has been added, and this is a polygonal pyramid, or, and preferably, a cone, with a specularly reflecting exterior surface. Light distributor 14 is positioned inside of integrating sphere 15 directly in front of the entrance window 13.

The light distributor performs two functions. It distributes the light, emanating from the filament 11 and reflected by the elliptical reflector 12, and it prevents direct rays coming from entrance window 13 from reaching the area of exit window 16. This is desirable, since direct rays may cause objectionable streaks or patterns in the plane of the exit window and, therefore, of the negative, and subsequently also upon the final print of the sensitized sheet 19. Since the light distribution effect in this manner is inherently symmetrical with respect to the optical axis 10, the illumination system of the present invention attains, with a single source of light, a more nearly uniform illumination of the negative 17 than is attainable with the two light sources previously employed, as shown in my issued U.S. Pat. No. 3,028,483.

Other than the mentioned differences, the arrangement shown in FIG. 1 is identical with corresponding arrangements of the prior art. Thus, the light source 11, which has been shown schematically as the filament of an incandescent lamp, is placed at the first focal point $F_1$ of light collector 12, which latter is formed by an elliptical surface of revolution with a specularly reflecting interior surface. Light collector 12 is mounted above light integrator 15 in a manner such that the second focal point $F_2$ falls within the area of the entrance window 13. The light integrator 15, in a known manner, is a hollow and usually spherical body with a matte, white, diffusely reflecting interior surface. Light exit window 16 is preferably closed by a translucent sheet of plastic material or the like, although this is not strictly necessary. In operation, a negative or transparency 17 is positioned in front of exit window 16, and a lens 18 projects a usually enlarged image upon a sheet of sensitized material 19.

THE APERTURE REDUCER

It is of the utmost importance for the solution of the problem solved by the invention that light distributor 14 and, consequently, entrance window 13 be kept as small as possible compared to the dimensions of light integrator 15. Otherwise, an objectionable shadow would appear in the center of exit window 16 and this shadow subsequently would become visible on the print made on sheet 19. This becomes a major problem, particularly for smaller integrators which are suitable for smaller negatives, and the solution of this problem constitutes a major feature of the present invention.

It will be apparent, from an examination of FIG. 1, that the simple arrangement illustrated therein is practical for large units only, for example, those adapted to enlarge negatives of the 5" x 7" or 8" x 10" size. The reason for this will now be explained.

While it is generally assumed that an elliptical reflector projects all rays, originating in the first focal point $F_1$, into the second focal point $F_2$, this is true only for a mathematical point of light. For a real source of light with even small physical dimensions, the situation is more complicated. Thus, and as distinguished from the lens which forms a single, well defined image, which is geometically similar to the source of light, an elliptical reflector forms a circle of light consisting of an infinite number of images, all of different sizes, which are superposed upon each other in the plane of the second focal point $F_2$. Each of these images is formed by the rays reflected by an infinitely thin ring-shaped zone which is concentric with and normal to the optical axis. For example, the reflector may be conceived of as consisting of an infinite number of these zones, each forming an image of a different size. The size of each image equals the size of the light source magnified by a factor that represents the ratio of the distance of that particular zone from the two focal points, respectively. The largest of these images originates from the region A of FIG. 1, which is directly behind the first focal point $F_1$. The magnification ratio in this case is simply $F_2A/F_1A$. Based on these considerations, the diameter of the circle of light, and the necessary size of the entrance window, can now be estimated.

Suitable commercially available lamps have filaments ranging in size from at least one quarter inch to one half inch or more, depending upon their wattage. The factor $F_2A/F_1A$ is, for reflectors of practical dimensions, of the order of magnitude of approximately 4 to 6. This means that the circle of light and, therefore, the entrance window usually will not be much smaller than two inches in diameter, and sometimes larger. The base of the light distributing cone, or light distributor, 14 becomes even larger, as can be readily seen from FIG. 1. Furthermore, for large negatives, integrating spheres of ten inches to fifteen inches in diameter are used, and a two inches in diameter light entrance window is not objectionable. For smaller negatives, and correspondingly smaller integrating spheres, difficulties arise. The negative size most frequently used at the present is the so-called 35 mm. size (approximately 1" x 1½"), and this requires an integrating sphere that needs to be no larger than 2½ inches in diameter. Clearly, a 2½ inches in diameter sphere is not compatible with a two inches in diameter entrance window and an even larger light distributor.

In accordance with the invention, an additional element is employed and reduces the size of the entrance window. This additional element will hereinafter be referred to as an "aperture reducer." It is essentially an inverted truncated cone, or polygonal pyramid, made from clear transparent material with an index of refraction larger than unity, such as glass, acrylic plastic, or the like. Its position relative to the other components is shown at 20 in FIG. 2.

Figure 2:
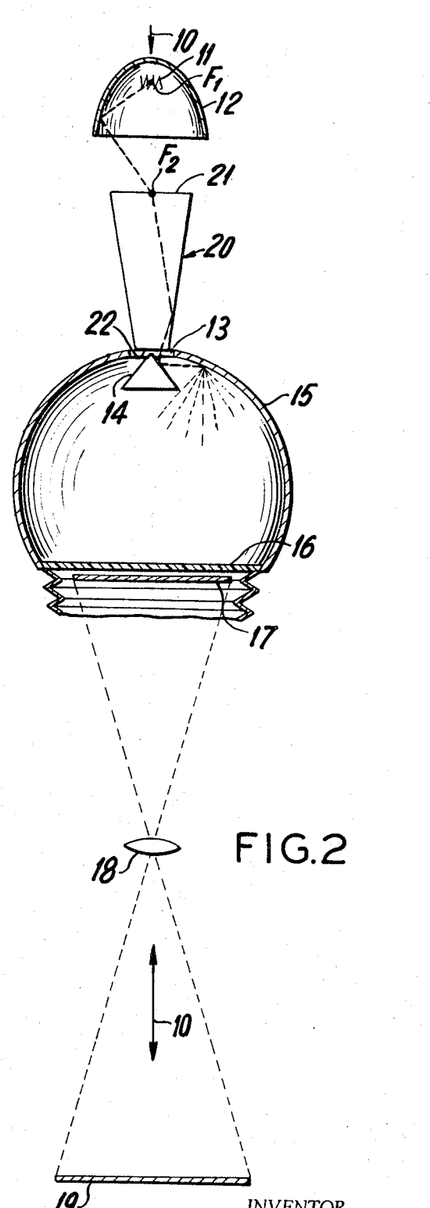
FIG. 2 is a view, similar to FIG. 1, but illustrating the illuminating system including the aperture reducer.

Referring to FIG. 2, it will be noted that the sub-assembly, comprising lamp 11 and light collector 12, has been raised with respect to light integrator 15, or moved further away from entrance window 13. Thus, aperture reducer 20 can be mounted between this sub-assembly and the light entrance window. The second focal point $F_2$ of the light collector 12 now falls within the area 21 of the large entrance aperture of inverted truncated cone 20, while the smaller exit aperture 22 of this cone coincides with light entrance window 13 of light integrator 15.

Figure 3:
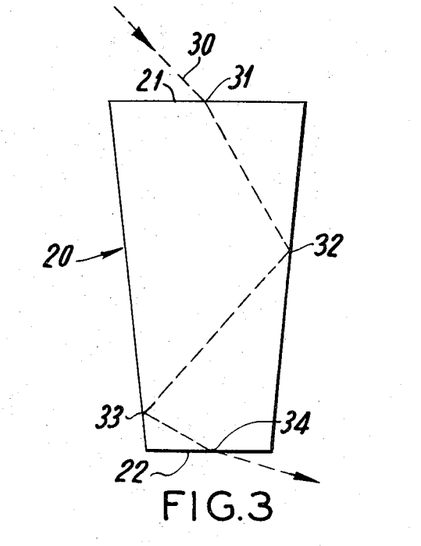
FIG. 3 is a side elevation view schematically illustrating the function of the aperture reducer.

The function of the aperture reducer can be explained, with reference to an example, with the help of FIG. 3. An incident ray 30 intersects the plane of entrance aperture 21 at a point 31, and here undergoes a certain refraction, depending upon the angle of the incidence and the index of refraction of the transparent material from which aperture reducer 20 is made. This ray 30 then strikes the conical wall at a point 32 and, if the angle between ray 30 and the conical wall is sufficiently accute, total reflection will take place, causing ray 30 to travel obliquely toward the opposite wall upon which it is incident at point 33. At point 33, ray 30 is again reflected and finally intersects the plane of exit aperture 22 at a point 34. If the angle between ray 30 and the plane of exit aperture 22 is not too small, ray 30 will leave aperture reducer 20 after undergoing a second refraction. This time, however, the refraction is in the opposite sense since light ray 30 is now passing from a denser medium into a less dense medium.

It will be understood that the ray 30 thus traced is exemplary only. Some rays may be reflected more than twice, and some rays, which are parallel or nearly parallel to the optical axis, may pass through the aperture reducer without being reflected at all. For example, the ray shown in FIG. 2 undergoes one reflection only. The use of aperture reducer 20 effects a significant reduction in the size of the light entrance window 13 of the integrating body 15, and thereby makes possible the use of smaller integrating bodies which are better adapted to illuminate smaller negatives or transparencies.

In addition to the general principle of this invention, which has been described heretofore, preferred designs of sub-components, which contribute further to the improved performance of the illumination system, form important features of the invention which will now be described.

PREFERRED DESIGN OF THE LIGHT COLLECTOR

The need for an improvement in the design of the light collector is not due to any deficiencies of the elliptical reflector per se, but rather due to certain characteristics of the aperture reducer 20. As can be seen from FIG. 3, the angle initially formed between any ray, within the body of aperture reducer 20, and the optical axis is increased after each reflection by twice the angle formed between the conical wall and the optical axis. As a consequence, after a few reflections, either the ray strikes the side wall at such a steep angle that total reflection no longer occurs and the ray escapes laterally, or the light ray impinges upon the plane of exit aperture 22 at such an acute angle that it cannot leave the body of aperture reducer 20 and is reflected back into its interior. Either condition causes serious loss of light, and limits the permissible number of reflections, thereby making it impossible to reduce the diameter of exit aperture 22 below a certain size.

It thus becomes desribale to increase the possible number of reflections, and this can clearly be done by making the largest "initial" angles, under which any ray enters the aperture reducer, as small as possible, as then more reflections may occur before a critical angle is reached. However, this must be done without increasing the size of the circle of light that determines the size of entrance aperture 21, because any increase of the size of the entrance aperture would cause a proportional increase of the size of the exit aperture 22, and it is herein that the difficulty lies. The aforementioned largest "initial" angle can be reduced by making the ellipsis more eccentric, but doing so increases automatically the the magnification factor $F_2A/F_1A$, thereby increasing the diameter of the circle of light and of the entrance aperture. This cancels any gain that may be derived from the smaller "initial" angle.

Figure 4:
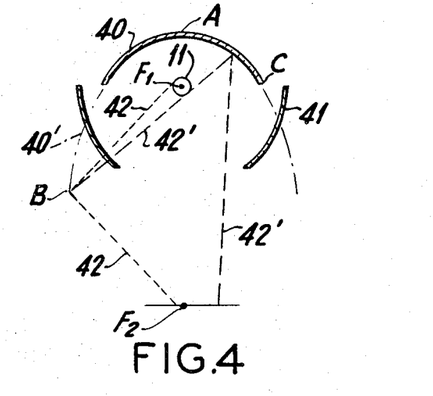
FIG. 4 is a sectional view illustrating the preferred design of the light collector.

In accordance with the invention, this problem is solved by forming a light collector as shown in FIG. 4. The new design shown in FIG. 4 can be explained best by first contemplating the performance of a hypothetical, conventional elliptical reflector that has been purposely illustrated as consisting of two parts, with one part 40 extending to the rear of focal point $F_1$ and shown in solid lines, and another part 40' forwardly of focal point $F_1$ and shown in dotted lines. Disregarding part 41 for the moment, the light rays that form the largest angle with the optical axis are those reflected by point B, or more particularly light ray 42.

If forward portion 40' of the reflector is now omitted and replaced by a spherical, specular reflector 41 having the focal point $F_1$ as its center, all rays which formerly impinged on part 40' are now reflected toward focal point $F_1$ and are then reflected by rear reflector 40 into the plane of focal point $F_2$. This is possible since the filament 11 is not a solid body, but comprises spaced convolutions that permit most of the light to pass. It will be clear that ray 42', which replaces ray 42, forms a much smaller angle with the optical axis. The ray forming the largest angle with the optical axis is now the one reflected at point C, instead of that reflected at point B. This permits at least one additional reflection within the aperture reducer 20 before a critical angle is reached, and the exit aperture 22 or, what is the equivalent, the entrance window 13 of integrating body 15 may be made correspondingly smaller.

PREFERRED DESIGN OF THE APERTURE REDUCER

The diameter of the exit aperture 22 of aperture reducer 20 may be expressed as the product of the diameter of entrance aperture 21 multiplied by a certain reduction factor which is a function of the shape of aperture reducer 20. In accordance with the invention, not only the size of entrance aperture 21 but also the magnitude of such reduction factor can be reduced, as will now be described.

As shown in FIG. 2, entrance aperture 21 is in the same plane as the second focal point $F_2$ of the eliptical reflector. This is not necessarily the best location, and an appreciable improvement can be effected by moving entrance aperture 21 to a slightly high position. For the precise determination of this optimum position, reference is made to FIG. 5. As has been explained previously in an elliptical reflector each element forms a spot of light in the plane of the second forcal point, and of a size that is equal to the size of light source multiplied by the ratio of the distances of the respective element from the second focal point and from the first focal point, respectively. However, the beams reflected by the various elements of the elliptical reflector vary not only with respect to the size of the spot but also with respect to the angle at which they intersect the focal plane.

Figure 5:
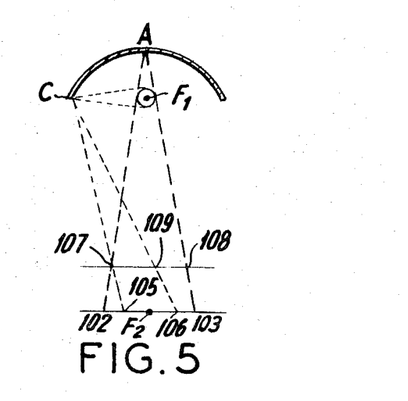
FIG. 5 diagrammatically illustrates the precise determination of the optimum position of the light entrance aperture with respect to the light collector.

The two extreme cases are represented by the beams or rays that are reflected by elements at or near the center of the reflector and by elements at the rim of the elliptical reflector. The beam reflected at element or point A forms a spot, in the plane of focal point $F_2$, that has a diameter 102–103, and this diameter equals $L \cdot F_2A/F_1A$ where L is the size of the light source. Likewise, the beam reflected by element or point C forms a spot having a diameter 105–106 which is equal to $L \cdot F_2C/F_1C$. This spot is, of course, smaller than the first-named spot since $L \cdot F_2C/F_1C$ is smaller than $$L \cdot F_2A/F_1A$$

The two beams or rays intersect at a point 107, and a plane through this point and normal to the optical axis, gives the preferred position for the entrance aperture 21 of aperture reducer 22. In other words, an aperture reducer 22 in this position will have the smallest entrance aperture that still accept the entire light flux emanating from the elliptical reflector.

The simple cone shown in FIG. 3 permits a reduction of the diameter of the exit aperture 22 to approximately 60% of the diameter of the entrance aperture 21. If the size of exit aperture 22 is made still smaller, serious light losses occur, either by light escaping through the side walls, because the incident angle becomes too steep for total reflection, or by light not passing through exit aperture 22 because the incident angle thereat becomes so small that light is totally reflected back into the interior of aperature reducer 20.

Figure 6:
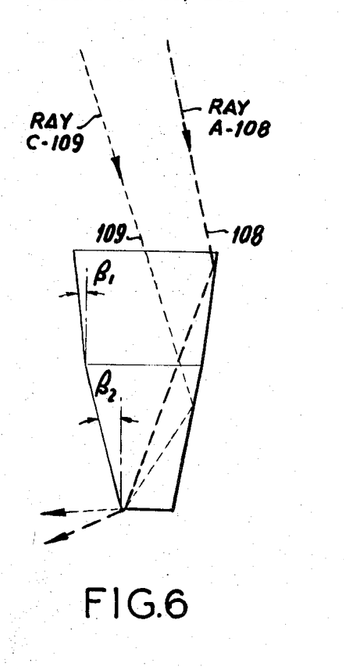
FIGS. 6 and 7 are elevation views of two forms of aperture reducers embodying the invention.

It is useful to trace the two rays that form the largest angle with the opposite axis, originating respectively, at the center and at the rim of the elliptical reflector, i.e., ray A–108 and ray C–109. Ray A–108 will be called the center ray and ray C–109 will be called the rim ray. The center ray A–108 strikes the plane of entrance aperture 21 at or near its periphery, whereas the rim ray enters the body of aperture reducer 20 more or less near the optical axis thereof. As seen in FIG. 6, the consequence of this is that the rim ray, after refraction at the entrance plane, travels a considerable distance in an oblique direction before being reflected by the side wall for the first time, whereas the center ray, after refraction, strikes the side wall almost immediately.

This situation makes it possible to reflect the two rays A–108 and C–109 in respective different manners, by making the angle formed between the side wall and the optical axis relatively small for center ray A–108 and larger for rim ray C–109. This results in a novel shape for aperture reducer 20, which now comprises essentially two coaxial and axially adjacent cones, the upper cone extending downwardly from entrance aperture 21 and having a relatively small angle $\beta_1$, and the lower cone extending upwardly from exit aperture 22 and having a relatively large angle $\beta_2$. The shape of the resultant aperture reducer may also be described as a surface of revolution generated by a broken line comprising 4 straight portions or parts, the first part being equal to the radius of the entrance aperture 21 and perpendicular to the optical axis, the second part intersecting the first part with its extension forming a relatively small angle with the optical axis, the third part intersecting the second part with its extension forming a relatively large angle with the optical axis, and the fourth part being equal in length to the radius of exit aperture 22, intersecting the third part and being at right angles with the optical axis. A structure of this type is shown in FIG. 6.

Figure 7:
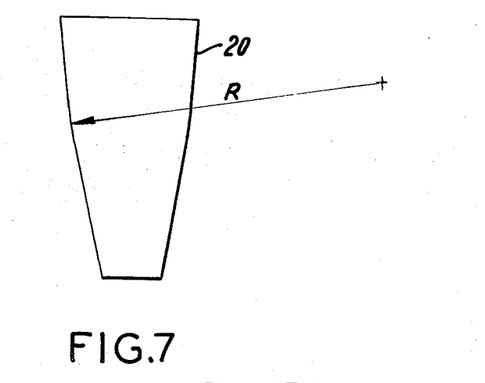

There still is a certain danger that light losses may occur for some rays that are intermediate, with respect to both angle relation and position, between the two extremes, namely the center ray and the rim ray, which have been considered exclusively up to this point. These rays will be reflected by the side wall in a region near the plane where the two cones meet. This danger can be avoided by making the transition between the two cones gradual. Thus, in the description of the aperture reducer as a surface of revolution, the second and third parts will not intersect directly but will be connected by a curve to which both straight lines are tangential, as seen in FIG. 7.

No mention has been made about the relative lengths of the second and third straight portions of the surface of revolution, and of the curved portion, because the proportions are largely a matter of choice. In other words, the sum of the lengths of the second and third straight lines of the surface of revolution, measured in the direction of optical axis, which means the actual length of the second part multiplied by the cosine of the angle between the extension of the second part and the optical axis plus the corresponding dimension of the third part, may have any value between 0% and 100% of the axial length of the aperture reducer. The two extremes therefore are either one in which the surface of revolution is generated solely by a curved line, with the lengths of the straight lines being zero, or one in which the surface of revolution is formed solely by the combination of the second and third straight lines, wherein the sum of the lengths of these lines, measured parallel to the optical axis, is equal to 100% of the axial length of the aperture reducer. The last-named case is, of course, identical with the configuration comprising two adjacent truncated cones as shown in FIG. 6.

In the drawings, it has been assumed that both rays A–108 and C–109 will undergo one reflection each by the wall of the aperture reducer. This is the simplest case, but not the only conceivable case, and substantially similar configurations may be obtained for two or even more reflections.

It should be stated that all considerations up to this point are strictly correct for only those rays which lie in planes that contain the optical axis. For all other rays, such as the skew rays, the ray tracing becomes infinitely more complex, and every thing mentioned heretofore must be regarded as an approximation only. For practical purposes, however, this approximation is sufficiently close, since an aperture reducer designed accordingly exhibits satisfactory performance characteristics which are reasonably close to theoretical predictions. In the manner described, it has been possible to reduce the diameter of the exit aperture 22 to 40% of the diameter of the entrance aperture 21, which compares favorably to the value of 60% possible with a straight-sided single cone.

PREFERRED DESIGN OF THE LIGHT DISTRIBUTOR

The coaction of the aperture reducer 20 and light distributor 14 may produce another light loss, as will now be explained. The most efficient design of an aperture reducer is one that permits the ray, entering the reducer at the largest angle, to impinge upon the plane of exit aperture 22 at an angle that is almost, but not quite, sufficiently acute to cause this ray to be totally reflected back into the aperture reducer. After being refracted, by travelling from a denser medium into a less dense medium, this ray will leave the body of the aperture reducer in a direction that is nearly horizontal. The other extreme is represented by those rays that enter the aperture reducer in a direction more or less parallel to the optical axis, and these rays, which are not reflected at all, will leave exit aperture 22 in a direction substantially perpendicular to the plane thereof. All intermediate angles fall between these two extremes, so that each point of exit aperture 22 emits rays in all directions.

Figure 8A:
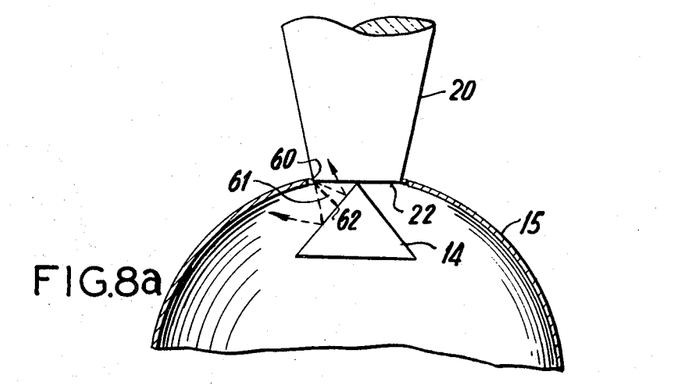
FIG. 8a is a partial side elevation view, partially in section, illustrating the coaction of the aperture reducer and the light distributor.

Referring to FIG. 8a, and applying the foregoing considerations, it can be seen that one ray 61 is perpendicular to the specularly reflecting surface of light distributor 14. This ray will be reflected back, at point 62, to point 60. All rays striking light distributor 14 below point 62 will be reflected into the interior of light integrator 15, as they should be. However, all rays striking light distributor 14 above point 62 will be lost because they are reflected toward exit aperture 22 of aperture reducer 20. This loss can be appreciable.

Figure 8B:
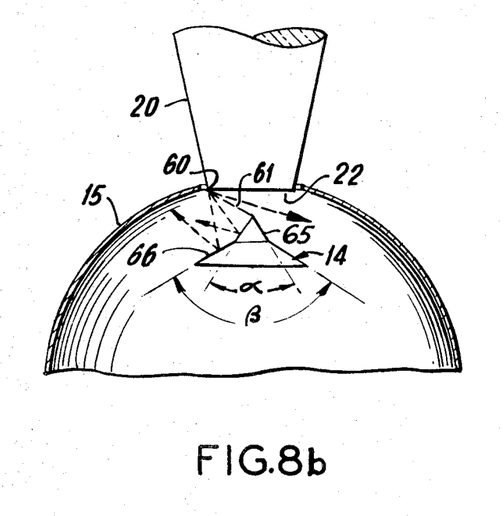
FIGS. 8b and 8c are views, similar to FIG. 8a, illustrating preferred forms of the light distributor and preferred relations of the aperture reducer and the light distributor.

While not the best solution, it is possible simply to mount light distributor 14 lower with respect to the aperture reducer, by placing its apex at the point of intersection of ray 61 and the optical axis, as shown in FIG. 8b. This has the disadvantage that the base of light distributor 14 must be made larger and must be placed closer to the light exit window 16 of light integrator 15, thereby increasing the danger that an objectionable shadow may be formed in the plane of light exit window 16.

Another possibility, which is that of making the apex angle of light distributor 14 smaller, is even less attractive, because it can be seen easily that this would make the base of the cone even larger and place it even closer to light exit window 16.

For these reasons, a design such as shown in FIG. 8b is preferred. In FIG. 8b, the body of light distributor 14 consists of two parts, an upper part 65 with a small apex angle α and a lower part 66 with a relatively large apex angle β. It will be apparent that no rays will be reflected toward exit aperture 22 if angles α and β are chosen properly.

Figure 8C:
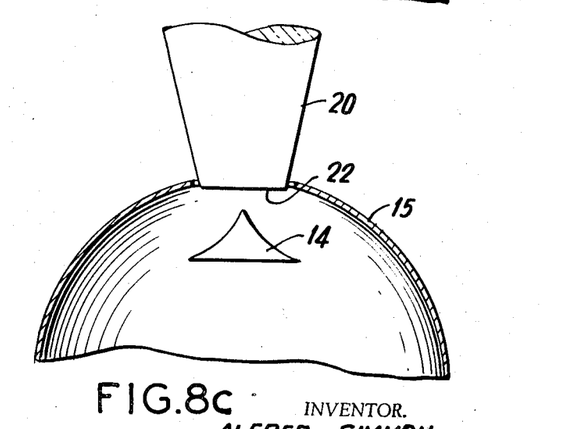

The transition between the upper part and the lower part may be made gradual by replacing the broken line, by which the reflecting surface of revolution of light distributor 14 is formed, by a continuous curve, as shown in FIG. 8c.

PREFERRED DESIGN OF THE INTEGRATING BODY

In its simplest form, the light exit window 16 of the integrating body 15 is the intersection of a plane and a sphere, i.e., a circle. The light is substantially uniformly distributed over the area of this circle, and the total light flux therefore equals the light intensity per unit area multiplied by the area of the circle. The light that is actually utilized, however, is only the product of the light intensity multiplied by a much smaller rectangular or square area which needs to be only slightly larger than the area of the transparency to be illuminated. An appreciable part of the light, amounting to approximately one-third, is therefore wasted. An improvement of the integrating body, by means of which a significant part of this waste can be obviated, will now be described.

Figure 9A:
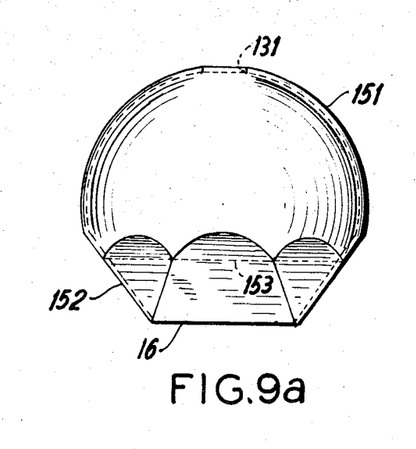
Figure 9B:
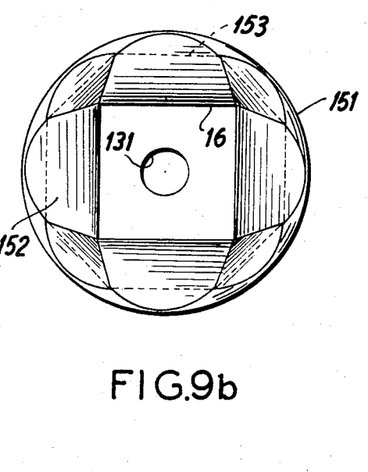

One embodiment of a typical light integrating body is shown in FIGS. 9a and 9b. The integrating body shown in FIGS. 9a and 9b comprises two parts, an upper part 151 which is still spherical and which contains, in line with the optical axis, the relatively small light entrance window 131, and a lower part 152, which is defined by straight lines which connect the points of a polygon, in this case, an octagon, with the corners of a rectangle or a square. Octagon 153 is shown in dotted lines, and is positioned in a plane normal to the optical axis and intersects this axis relatively close to the center of the sphere. The points of the octagon lie on the interior surface of this sphere, and the intersection of its diagonals coincides with the optical axis. The rectangle or square represents the light exit window and is therefore as large as, or slightly larger than, the negative or transparency. It also lies in a plane perpendicular to the optical axis but which, however, is at a certain distance, typically, but not necessarily, about two-thirds of the radius of the sphere, below the first-named plane, and the intersection of its diagonals also coincides with the optical axis.

Octagon 153 may be rotated around the optical axis and therefore may assume any angular position with respect to the rectangle. However, only two positions, of all conceivable positions, are of practical importance. These positions includes one in which the sides of the octagon may be parallel to the respective sides of the rectangle, or a second in which two mutually perpendicularly diagons of the octagon may be parallel to the sides of the rectangle. A structure based on the first position will now be discussed.

In this case, two adjacent points of the octagon are always connected by straight lines to the nearest corner of the rectangle or square, thereby defining four trapezoids which alternate with four triangles. The planes of these trapezoids and triangles are then extended between the respective points of the octagon to the lines of intersection of the planes and the upper spherical portion 151. The intersection lines, representing intersections of planes and a sphere, are circular arcs. The trapezoidal and triangular side wall portions are physical bodies which are easily fabricated from sheet metal or the like, but the octagon and the rectangle are empty geometrical configurations.

Figure 10A:
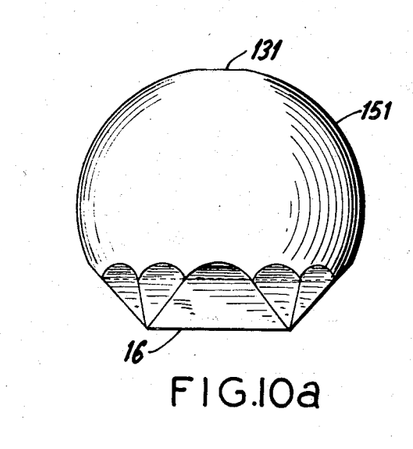
Figure 10B:
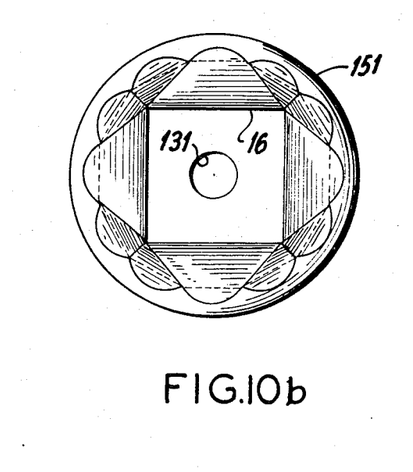

It is now possible to conceive of a whole family of similar bodies, of which the structure just described is merely a representative example. While this design was based on a polygon with eight sides, other polygons may be readily used, as long as the number of sides thereof is divisible by four. In algebraic terms, with the polygon of four $n$ sides, $n$ adjacent points are connected by $n$ straight lines to the nearest of the four corners of the rectangular or square exit window, thereby defining four trapezoids which are separated from each other by groups of $n-1$ triangles. An example based on twelve sides ($n=3$) is shown in FIGS. 10a and 10b.

Figure 11A:
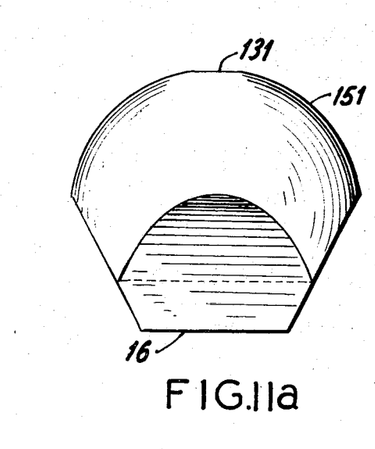
Figure 11B:
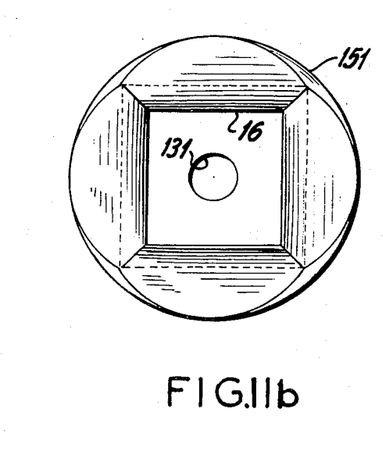

Since $n$ may be any integer between 1 and infinity, the two extreme cases are obtained for these two values, and this may require some explanation. For $n=1$, there results a four-sided polygon which may be a square or a rectangle. There are still four trapezoids, but the number of intervening triangles now becomes zero, and the trapezoids are separated merely by straight lines, as seen in FIGS. 11a and 11b.

Even these straight lines may disappear under certain circumstances. It has been pointed out previously that the distance between the two planes containing the upper polygon and the lower rectangle or square is usually about two-thirds of the radius of the sphere, but that this is not necessarily so and the distance can be smaller. The distance may even be made zero and, in this case, the four-sided polygon and the rectangular or square light exit window are of identical size and coincide. The side walls of the lower portion of the integrating body are thus reduced to mere segments, as is shown in FIGS. 12a and 12b.

Figure 13A:
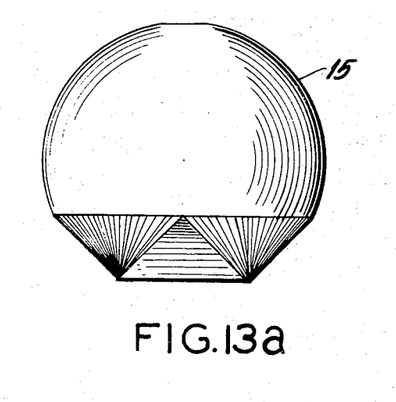
Figure 13B:
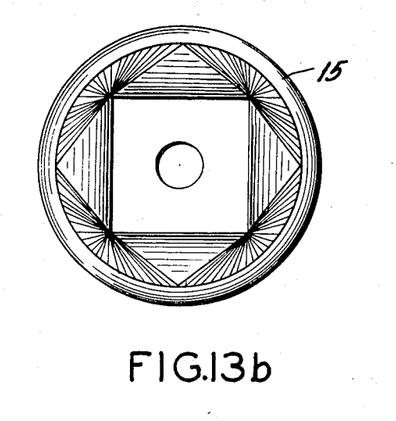

For $n=\infty$, the polygon becomes a circle, and the length of each side of the polygon, and also the length of the upper horizontal side of each trapezoid, becomes zero. In other words, the four trapezoids become triangles, having their faces facing downwardly and their apices pointing upwardly. These four relatively large triangles alternate with four groups of infinitely many and infinitely narrow triangles, having apieces pointing downwardly. The result is four plane triangles separated by four curved, conical surfaces, as shown in FIGS. 13a and 13b. It should be understood that these two extreme cases are comprised in the terminology defining the integrating bodies in the claims.

Figure 14A:
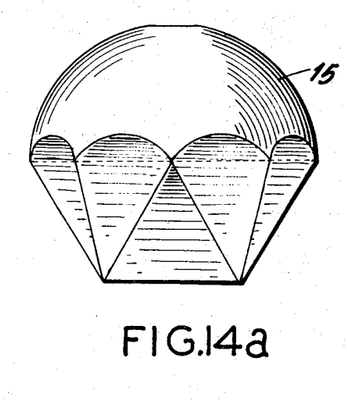
Figure 14B:
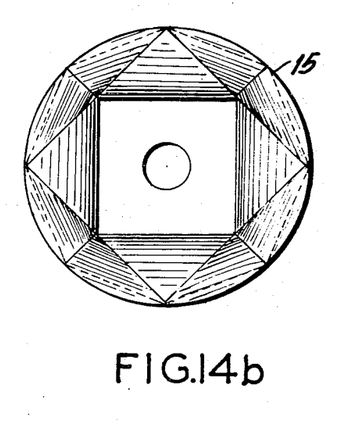
Figure 15A:
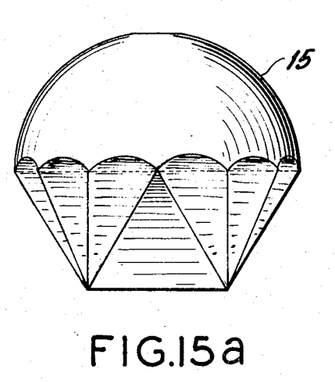
Figure 15B:
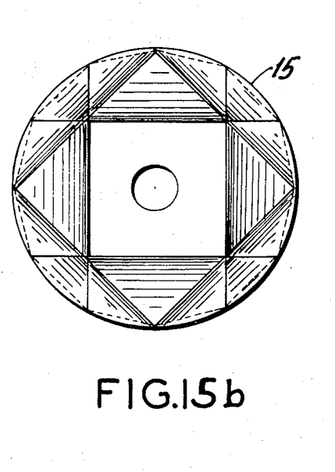

There will now be described similar light integrating bodies in which not four sides of the polygon but four of its diagonals are parallel to corresponding sides of the rectangle or square. A typical structure, again based on an octagon, is shown in FIGS. 14a and 14b. By reference to FIGS. 14a and 14b, it will be seen that three adjacent points of the octagon are now connected by respective straight lines to the nearest point of the rectangular or square light exit window, thereby defining twelve triangles. Four of these triangles have a base equal in length to the associated side of the rectangle or square, and the apex of each of these triangles points upwardly. The other eight triangles have bases formed by a respective side of the octagon, and the apex of each of these eight triangles points downwardly. Groups of two of the last-named triangles alternate with one of the first-named triangles, and the respective planes of the eight triangles are again extended to their lines of intersection with the upper spherical portion of the integrating body.

Figure 12A:
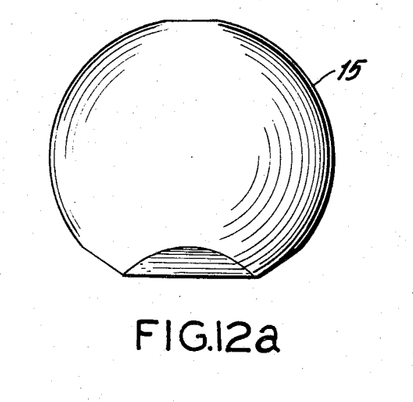
Figure 12B:
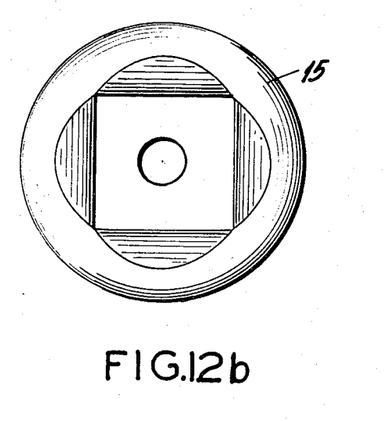

This structure shown in FIGS. 12a and 12b may be regarded as a representative example of a family of possible integrating bodies based on polygons or any conceivable number of sides as long as the number of sides is a multiple of four. Therefore, in general terms, the polygon may have $4n$ points with $(n+1)$ points connected by straight lines to the nearest point of the rectangle or square, and thereby defining four $(n+1)$ triangles. Four of these triangles have bases formed by a respective side of the rectangle or square, and four groups, of $n$ triangles each, have bases formed by one of the sides of the polygon, each group being positioned between two adjacent triangles of the first-mentioned type. The apex of each of the first-named four triangles points upwardly, conversely, the apex of each of the other $4n$ triangles points downwardly. The planes of the $4n$ triangles are extended between the points of the polygon to their respective lines of intersection with the spherical upper part. As examples, FIGS. 15a through 17b show, respectively, structures based on $n=3$, $n=2$ and $n=\infty$.

Figure 16A:
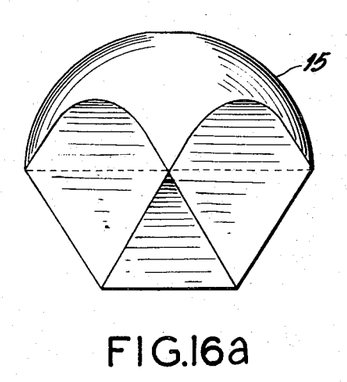
Figure 16B:
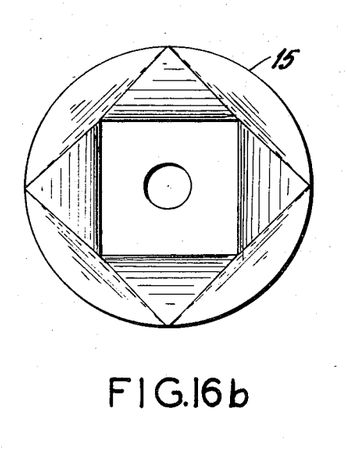
Figure 17A:
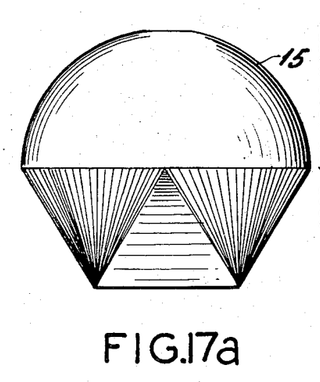
Figure 17B:
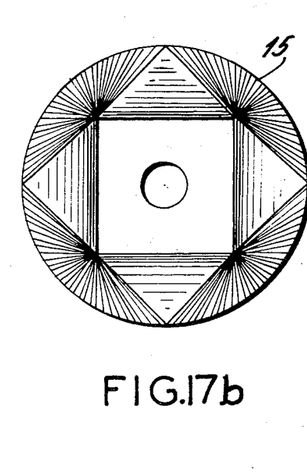

As a practical matter, the most favorable design probably is that based on $n=2$ (the octagon) as shown in FIGS. 16a and 16b, because it combines satisfactory performance with relative simplicity. The shape based on $n=1$ (square or rectangle) shows a somewhat less uniform light distribution over the area of the light exit window, and designs based on polygons with more than eight sides ($n>2$) merely render the structure more complicated without any noticeable improvement in performance. It has been found, by actual measurement, that a light integrating body of this type increases the light output by 20–30% over that of a simple sphere having a circular light exit window.

Figure 18:
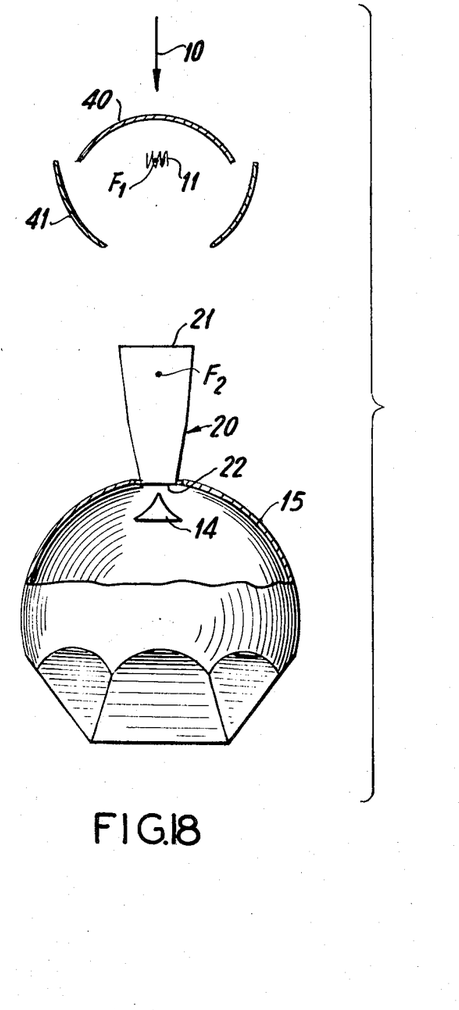
FIG. 18 is a part side elevation view and part sectional view illustrating the complete illuminating system of the invention.

FIG. 18 shows the complete illuminating system of the invention, incorporating the preferred designs of the various components as described above.

In the interest of clarity, all components or combinations of components have been shown schematically only, and all structural parts, by means of which these elements may be held in their respective positions, have been omitted, as it is believed that these structural parts are not necessary for an understanding of the invention.

In the claims, the terms "polygonal pyramid," or "pyramid with a polygonal base" are to be understood to include the special case of a "cone" or "cone with a circular base," because a circle can be considered as a polygon having an infinite number of sides.

What is claimed is:

1. An illumination system, adapted to illuminate a photographic negative or transparency, comprising, in combination, a source of light; a light collector including a substantially elliptical surface of revolution having a specularly reflecting interior surface; a light integrator in the form of a hollow body having a diffusely reflecting substantially white interior surface, and formed with a relatively small light entrance window and a relatively large light exit window; a light distributor constituted by a pyramid having a polygonal base, and having a specularly reflecting exterior surface; and means to support a negative or transparency positioned in front of said light exit window; said source of light being positioned at a first focal point of said elliptical surface of revolution; said light collector being positioned exteriorly of, but adjacent to, said light integrator with the second focal point of said elliptical surface of revolution falling within the area of said entrance window; said light distributor being positioned within said light integrator in front of said light entrance window, with the apex of said pyramid facing said light collector; said source of light, said two focal points of said elliptical surface of revolution, the respective centers of said light entrance window and said light exit window, the apex and the center of the polygonal base of said light distributing pyramid and the center of a negative or transparency all being aligned on a common optical axis.

2. An illumination system, adapted to illuminate a photographic negative or transparency, comprising, in combination, a source of light; a light collector including a substantially elliptical surface of revolution with a specularly reflecting interior surface; an aperture reducer in the form of an inverted truncated pyramid formed of transparent material having an index of refraction larger than unity, and including a relatively large polygonal light entrance aperture and a relatively small polygonal light exit aperture; a light integrator in the form of a hollow body having a diffusely reflecting substantially white interior surface and formed with a relatively small light entrance window and a relatively large light exit window; a light distributor in the form of a pyramid having a polygonal base and a specularly reflecting exterior surface; and means for supporting a photographic negative transparency in front of said light exit window; said source of light being positioned at a first focal point of said elliptical surface of revolution; said light collector being positioned adjacent said aperture reducer with the second focal point of said elliptical surface of revolution falling substantially into the area of said light entrance aperture; said aperture reducer being positioned exteriorly of, but adjacent to, said light integrator with the light exit aperture of said aperture reducer and the light entrance window of said light integrator in substantial coincidence; said light distributor being placed within said light integrator in front of said light entrance window with the apex of said pyramid facing said aperture reducer; said source of light, the two focal points of said light collecting elliptical surface of revolution, the respective centers of said polygonal light entrance and light exit apertures of said aperture reducer, the respective centers of said light entrance window and said light exit window of said light integrator, the apex and the center of the polygonal base of said light distributing pyramid and the center of said negative or transparency all being aligned on a common optical axis.

3. An illumination system, as claimed in claim 2, said light collector including an additional spherical reflector having an internal specularly reflecting surface; said reflecting elliptical surface of revolution extending rearwardly of said first focal point and being terminated by a plane perpendicular to said optical axis and including said first focal point; said spherical reflector extending forwardly of and concentric with said first focal point and being terminated by said plane perpendicular to said optical axis and passing through said first focal point, said spherical reflector having a front aperture passing rays reflected by said reflecting elliptical surface of revolution; the circle of intersection between said spherical reflector and said plane perpendicular to said optical axis and passing through said first focal point being at least as large as the circle of intersection between said reflecting elliptical surface of revolution and said plane perpendicular to said optical axis and passing through said first focal point.

4. An illumination system, as claimed in claim 2, in which said light entrance aperture of said aperture reducer is positioned between said two focal points of said elliptical surface of revolution and in a plane normal to said optical axis and containing the points of intersection between light rays reflected from substantially the center of said elliptical surface of revolution and light rays reflected from substantially the periphery of said elliptical surface of revolution.

5. An illumination system, as claimed in claim 2, in which said aperture reducer is a body defined by a surface of revolution generated by a broken line comprising four straight portions; the first portion extending perpendicular to said optical axis and having a length equal to the radius of said light entrance aperture; the second portion intersecting said first portion and forming a first angle with said optical axis; the third portion intersecting said second portion and forming a second angle with said optical axis, said second angle being larger than said first angle; and the fourth portion extending perpendicular to said optical axis and having a length equal to the radius of said light exit aperture, said last-named radius being shorter than said first-named radius.

6. An illumination system, as claimed in claim 5, in which said broken line additionally includes a curved portion; said curved portion being a continuation of and tangential to said second straight portion, and said third straight portion being a continuation of and tangential to said curved portion.

7. An illumination system, as claimed in claim 6, in which said entrance aperture of said aperture reducer is positioned in a plane normal to said optical axis, and between the two focal points of said reflecting elliptical surface of revolution; said plane containing the points of intersection between light rays reflected from substantially the center of said eliptical surface of revolution and light rays reflected substantially at the periphery of said elliptical surface of revolution; said light exit aperture being positioned in a plane normal to said optical axis, and the respective distances of said last-named plane from said two focal points being larger than the corresponding respective distances of said first-named plane from said two focal points.

8. An illumination system, as claimed is claim 7, in which the sum of the length of said second straight line portion, multiplied by the cosine of said first angle, plus the length of said third straight line portion, multiplied by the cosine of said second angle, has a value between zero and the full length of said aperture reducer as measured parallel to the direction of its axis.

9. An illumination system, as claimed in claim 2, in which said light distributor comprises first and second parts; said first part being cone-shaped with an apex and a base; said second part having the shape of a truncated cone with a relatively small top and a relatively large base; the base of said first part and the top of said second part engaging each other and being of the same size; the side wall of said first part forming, with said optical axis, a smaller angle than does the side wall of said second part.

10. An illumination system, as claimed in claim 9, in which the side wall of said first part forms, with said optical axis, an angle of less than 45°, and the side wall of said second part forms, with said optical axis, an angle of more than 45°.

11. An illumination system, as claimed in claim 2, in which said light distributor is a surface of revolution generated by a curved line intersecting said optical axis and having its center of curvature above a plane normal to said optical axis and passing through the point of intersection; the radius of curvature of said curved line being greater than the distance between said center of curvature and said optical axis.

12. An illumination system, as claimed in claim 2, in which said light distributor is a surface of revolution generated by a curve intersecting said optical axis and defining a body having an apex and a base; the angle between a tangent to said curve and the optical axis at said apex being smaller than the angle between a tangent to said curve and the optical axis at said base.

13. An illumination system, as claimed in claim 12, in which the angle between the tangent to said curve and said optical axis at said apex is smaller than 45°, and the angle between the tangent to said curve and said optical axis at said base being greater than 45°.

14. An illumination system, as claimed in claim 2, in which said light distributor is a surface of revolution generated by a curve intersecting said optical axis and defining a concave body having an apex and a base; the respective diameters of the circular cross sections of said body between said apex and said base being smaller than the corresponding diameters of the circular cross sections of a straight-sided cone having a base of the same size and an axial length equal to that of said body.

15. An illumination system, as claimed in claim 2, in which said light integrating hollow body comprises an upper part which is spherical and which is formed with an entrance window centered on said optical axis, and a lower part defined by straight lines connecting the points of a polygon with the corners of a rectangle constituting said light exit window; said polygon having $4n$ sides wherein $n$ is an integer between 1 and infinity, and being positioned in a plane normal to said optical axis; the $4n$ points of said polygon lying on the interior surface of said spherical part, and the intersection of its diagonals coinciding with said optical axis; said rectangle constituting said exit window being at least as large as the photographic negative or transparency to be illuminated; said rectangle being positioned in a plane normal to said optical axis, and the intersection of its diagonals coinciding with said optical axis; the spacing of said last-named plane from said entrance window being at least as great as the spacing of first-named plane from said entrance window; four sides of said polygon being parallel to respective different sides of said rectangle, and $n$ adjacent points of said polygon being conected to the nearest corner of said rectangle by $n$ straight lines; whereby to define four plane trapezoids alternating with four groups of $n-1$ plane triangles, with the planes of said trapezoids and said triangles being extended, between the points of said polygon, to the respective lines of intersection with said spherical upper part.

16. An illumination system, as claimed in claim 15, in which said polygon is an octagon.

17. An illumination system, as claimed in claim 2, in which said light integrating hollow body comprises an upper part which is spherical and which has an entrance window centered on said optical axis, and a lower part defined by straight lines connecting the points of a polygon with the corners of a rectangle constituting said light exit window; said polygon having $4n$ sides wherein $n$ is an integer between 1 and infinity, and being positioned in a plane normal to said optical axis; the $4n$ points of said polygon lying on the interior surface of said spherical part, and the intersection of its diagonals coinciding with said optical axis; said rectangle constituting said light exit window being at least as large as the photographic negative or transparency to be illuminated, and being positioned in a plane normal to said optical axis with the intersections of its diagonals coinciding with said optical axis; the spacing of said last-named plane from said light entrance window being greater than the corresponding spacing of said first-named plane from said light entrance window; two mutually perpendicular diagonals of said polygon being parallel to different respective sides of said rectangle; $n+1$ adjacent points of said polygon being connected by straight lines to the nearest point of said rectangle whereby $4(n+1)$ plane triangles are defined; the bases of four of said plane triangles being equal to a respective side of said rectangle and the apex of each of said plane triangles pointing upwardly; said four plane triangles alternating with four groups of $n$ triangles, each of which has bases equal to one side of the polygon with the apices of said $4n$ triangles pointing downwardly and their planes being extended to the respective lines of intersection with said spherical upper part.

18. An illumination system, as claimed in claim 17, in which said polygon is an octagon.

References Cited
UNITED STATES PATENTS

| | | | |
|---|---|---|---|
| 2,855,823 | 10/1958 | Klaus | 355—67 |
| 3,316,804 | 5/1967 | Weisglass | 355—67 |
| 3,492,070 | 1/1970 | Zahn | 355—70X |

JOHN M. HORAN, Primary Examiner

R. A. WINTERCORN, Assistant Examiner

U.S. Cl. X.R.

355—70